United States Patent [19]

Powers et al.

[11] Patent Number: 5,488,818
[45] Date of Patent: Feb. 6, 1996

[54] LAWN MOWER HAVING IMPROVED TRIM FEATURE

[75] Inventors: James R. Powers, Conyers; John W. Wilder; Frank H. Hancock, Jr., both of McDonough, all of Ga.

[73] Assignee: The Actava Group Inc., Atlanta, Ga.

[21] Appl. No.: 84,031

[22] Filed: Jun. 28, 1993

[51] Int. Cl.$^6$ ................................................. A01D 34/68
[52] U.S. Cl. ............................ 56/11.4; 56/11.8; 180/6.48
[58] Field of Search .................................. 56/11.4, 11.2, 56/11.5, 11.8; 180/6.48

[56] References Cited

U.S. PATENT DOCUMENTS

| | | |
|---|---|---|
| 2,329,372 | 9/1943 | Hitch . |
| 2,523,014 | 9/1950 | Gooch . |
| 2,588,004 | 3/1952 | Holmes . |
| 2,601,752 | 7/1952 | Rose . |
| 2,766,834 | 10/1956 | Boyer . |
| 2,941,609 | 6/1960 | Bower et al. . |
| 3,306,385 | 2/1967 | Kempson . |
| 3,323,607 | 6/1967 | Futamata . |
| 3,528,519 | 9/1970 | Case . |
| 3,540,220 | 11/1970 | Lauch . |
| 3,541,877 | 11/1970 | Houk . |
| 3,613,817 | 10/1971 | Glass et al. ............................ 180/6.48 |
| 3,616,869 | 11/1971 | Rilling et al. . |
| 3,620,096 | 11/1971 | Scolari . |
| 3,816,985 | 6/1974 | Sorenson et al. . |
| 3,876,021 | 4/1975 | Baumgartner ......................... 180/6.48 |
| 3,891,042 | 6/1975 | Braun .................................... 180/6.48 |
| 3,946,543 | 3/1976 | Templeton ............................. 56/10.9 |
| 4,043,416 | 8/1977 | Albright et al. ....................... 180/6.48 |
| 4,085,812 | 4/1978 | Robinson et al. ..................... 180/6.48 |
| 4,146,105 | 3/1979 | Scag ....................................... 180/70 R |
| 4,152,950 | 5/1979 | Langford ............................... 74/471 XY |
| 4,213,484 | 7/1980 | Habigger ............................... 137/636.1 |
| 4,301,881 | 11/1981 | Griffin ................................... 180/6.48 |
| 4,321,980 | 3/1982 | Nissen ................................... 74/471 XY |
| 4,327,539 | 5/1982 | Bricko et al. ........................... 56/113 |
| 4,487,006 | 12/1984 | Scag ....................................... 56/14.7 |
| 4,572,019 | 2/1986 | Suzuki ................................... 74/471 XY |
| 4,580,455 | 4/1986 | Beugelsdyk et al. ................... 56/11.3 |
| 4,667,459 | 5/1987 | Scanland et al. ....................... 56/11.3 |
| 4,736,647 | 4/1988 | Shimoie et al. ........................ 74/471 XY |
| 4,753,062 | 6/1988 | Roelle ..................................... 56/10.5 |
| 4,787,195 | 11/1988 | Wenzel ................................... 56/11.1 |
| 4,799,398 | 1/1989 | Asano ..................................... 74/473 R |
| 4,809,796 | 3/1989 | Yamaoka et al. ...................... 180/6.48 |
| 4,835,949 | 6/1989 | Seyerle ................................... 56/10.8 |
| 4,885,903 | 12/1989 | Scag ....................................... 56/10.8 |
| 4,920,733 | 5/1990 | Berrios ................................... 56/10.9 |
| 4,930,369 | 6/1990 | Barnard et al. ......................... 56/10.8 X |
| 4,991,382 | 2/1991 | Scag ....................................... 56/10.9 |
| 4,998,948 | 3/1991 | Osterling ................................ 56/12.6 |
| 5,020,308 | 6/1991 | Braun et al. ............................ 56/11.3 |
| 5,042,239 | 8/1991 | Card ........................................ 56/14.7 |
| 5,131,483 | 7/1992 | Parkes ..................................... 180/6.48 |
| 5,146,735 | 9/1992 | McDonner ............................. 56/11.3 |
| 5,279,376 | 1/1994 | Yang et al. ............................. 180/6.48 |

*Primary Examiner*—Terry Lee Melius
*Attorney, Agent, or Firm*—Jones & Askew

[57] ABSTRACT

A lawn mower is provided having improved steering controls, namely a "trim" feature which may be adjusted while the mower is in a forward speed setting. Further provided is a park lock feature which locks the speed controls of the mower. Finally, a neutral latch feature is provided which becomes engaged when the left and right steering controls of the mower are simultaneously position in either a neutral or a reverse position.

19 Claims, 8 Drawing Sheets

LAWN MOWER HAVING IMPROVED TRIM FEATURE

TECHNICAL FIELD

This invention relates in general to lawn mowers, and particularly relates to controls for a lawn mower providing improved steering features.

BACKGROUND OF THE INVENTION

In the field of lawn mowers, a need has been recognized for improved steering of lawn mowers. A particular need is apparent in the instance of hydraulically-driven lawn mowers. In hydraulically-driven lawn mowers, an engine (typically a gasoline-powered internal combustion engine) powers one or more hydraulic pumps, which drive two hydraulic motors which themselves drive wheels of a lawn mower. By controlling the flow of hydraulic fluid to the two hydraulic motors, the relative speed and rotation of the drive wheels may likewise be controlled. Such is shown in U.S. Pat. No. 3,876,021 to Baumgartner, incorporated by reference, a single engine drives two fluid pumps which drive two corresponding motors, each being coupled to a corresponding rear drive wheel. Control arms control the flow from the pumps.

A need has been recognized for a control system for such mowers which provides a "trim" feature, which allows the operator to finely adjust the relative speed of the drive wheels while the machine is moving. This may be especially needed when the operator has long stretches of straight-line operation; as may be understood, it is disadvantageous for an operator to have to continuously adjust the hand controls in order to keep the mower running in a straight line. By providing a trim feature, the operator can fine-tune the speed of the wheels to cause the mower to run in a substantially straight line. A trim feature may also be helpful when an operator is cutting on a hill; in such situations the mower may tend to turn downhill, and the trim feature can be used to compensate for such movement. A trim feature requiring a for tools for adjustment would also be advantageous.

A need has also been recognized for a control lock feature which prevents actuation of controls either intentionally or unintentionally, unless the operator physically unlocks the controls.

Finally, a need has also been recognized for a latching feature which must be disengaged after the mower has been backed up.

SUMMARY OF THE INVENTION

The present invention overcomes disadvantages in the prior art by providing a lawn mower having steering controls which allow the steering of the lawn mower to be "trimmed", as well as a lawn mower having an improved locking feature.

It is an object of the present invention to provide an improved steering control for a lawn mower.

It is a further object of the present invention to provide a lawn mower which has an improved trim feature.

It is a further object of the present invention to provide a lawn mower which has an improved locking feature.

It is a further object of the present invention to provide a lawn mower which is cost-efficient in operation.

It is a further object of the present invention to provide a lawn mower which is cost-efficient to produce.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

General Construction and Operation

Figure 1:
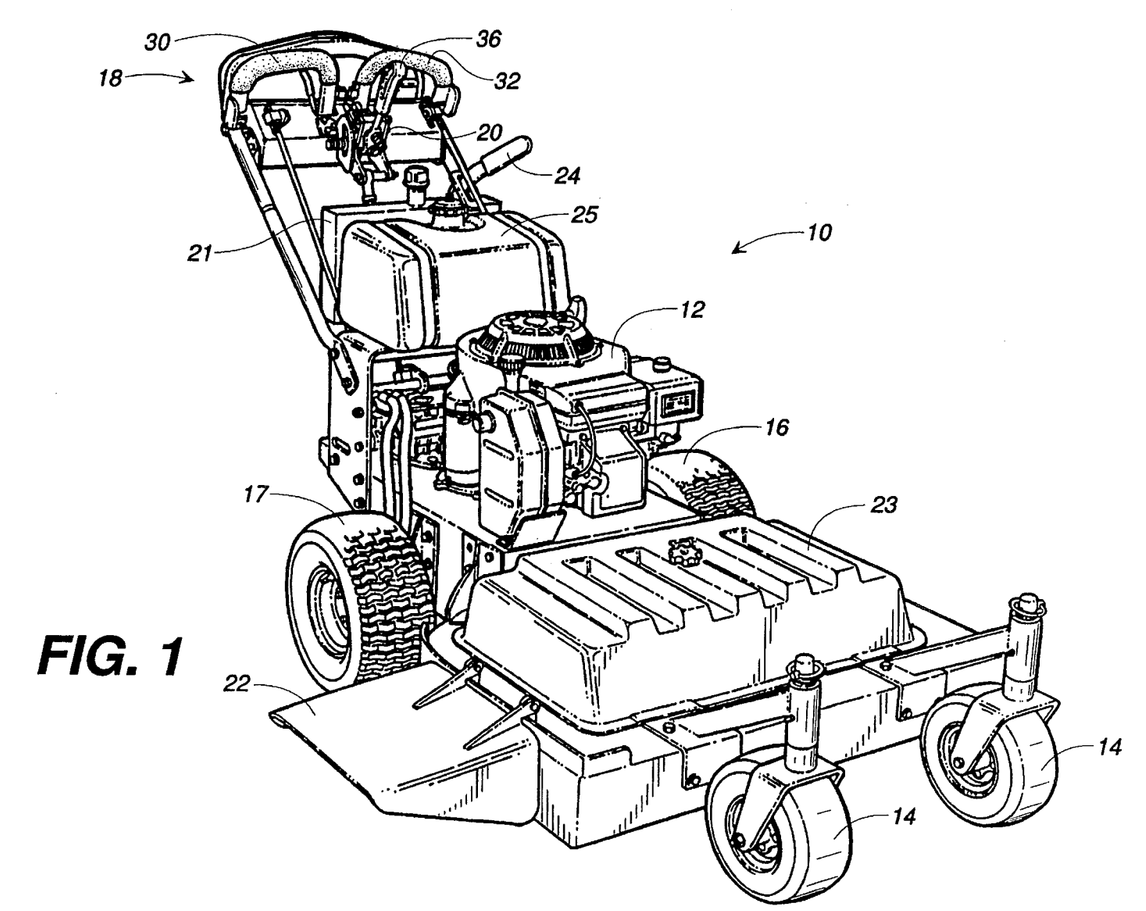
FIG. 1 is a front, right side pictorial view of a lawn mower according to the present invention.

Referring now to FIG. 1, a walk-behind commercial-type lawn mower 10 is illustrated. This lawn mower 10 includes an engine 12 (typically an internal combustion engine), a pair of front wheels 14, a left rear drive wheel 16, a right rear drive wheel 17, a handle assembly 18 (including a trim control subassembly 20), a grass deflector 22, a cutter engagement lever 24, a belt cover 23, a gasoline container 25, and an oil reservoir 21.

General Operation

As discussed in further detail later in this application, an operator's right and left hands 26, 28, may be used to control the right and left speed control handles, 30, 32, respectively, as well as the joystick lever 36, and the operator presence bar 38 which is directly behind the upper handlebar 40. As may be understood, the operator presence bar 38 must be in its "forward" position biased against the rear side of upper handlebar 40, in order for the engine to drive the drive wheels. When the operator presence control is not so engaged, the engine may be disconnected from its ignition source through suitable electric wiring known in the art.

Figure 2:
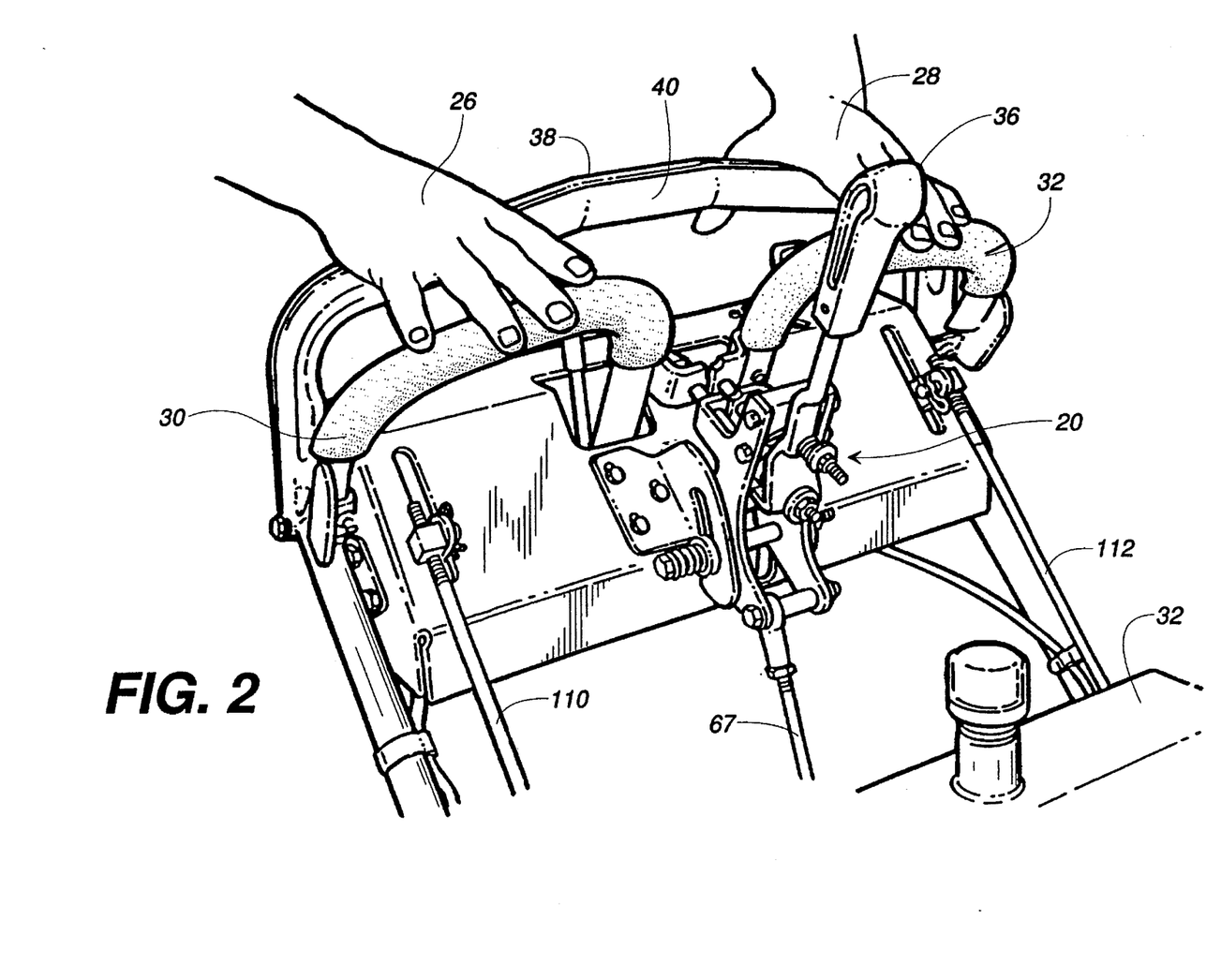
FIG. 2 is a front, right side pictorial partial view of the upper handle portion of the lawn mower of FIG. 1.
Figure 4:
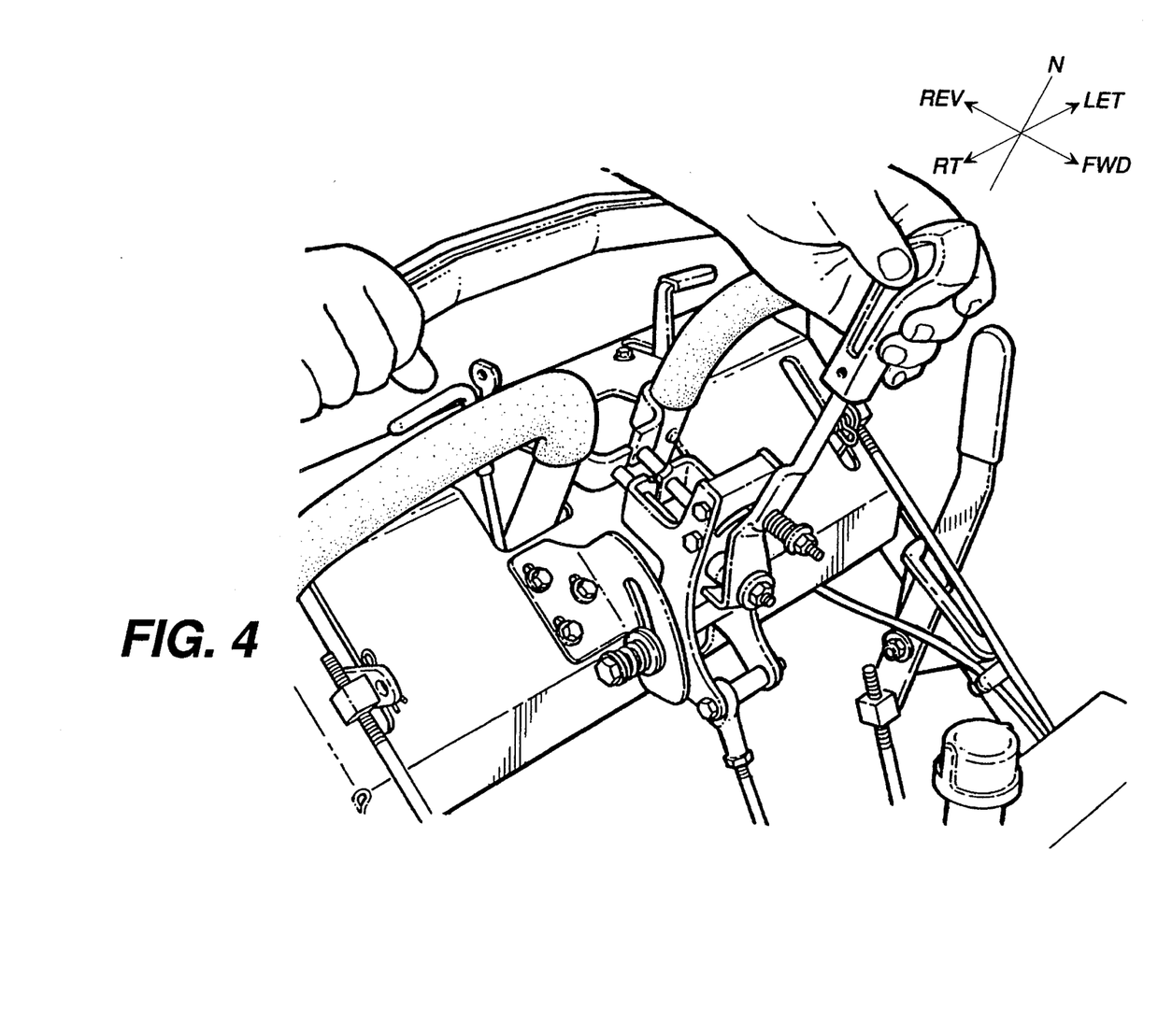
FIG. 4 is a view similar to that of FIG. 2, illustrating operation of the joystick, with the joystick in its maximum forward speed position, and with the trim leftward.

By then pushing the joystick 36 forward or rearward with one hand (as shown in FIG. 4), the maximum forward speed of either of the drive wheels my be adjusted. By using the fingers of the operator's hands, the operator may draw back (against a spring bias force) upon both of the handles (as shown in FIG. 2) in order to slow down the right or left drive wheels from the maximum set forward speed positions. By pulling the handles all the way back, the wheels may be brought to rest at a "neutral" position, and then into reverse. By manipulating the handles such that one wheel rotates at a forward speed, and the other wheel at substantially the same speed in reverse, the mower may be operated such that it has a "zero turning radius" (ZTR), or in other words the mower can rotate about a vertical axis located substantially between the drive wheels.

By pushing the joystick side-to-side, the set maximum forward speeds of the two wheels may be "trimmed", as discussed in later detail.

Figure 7:
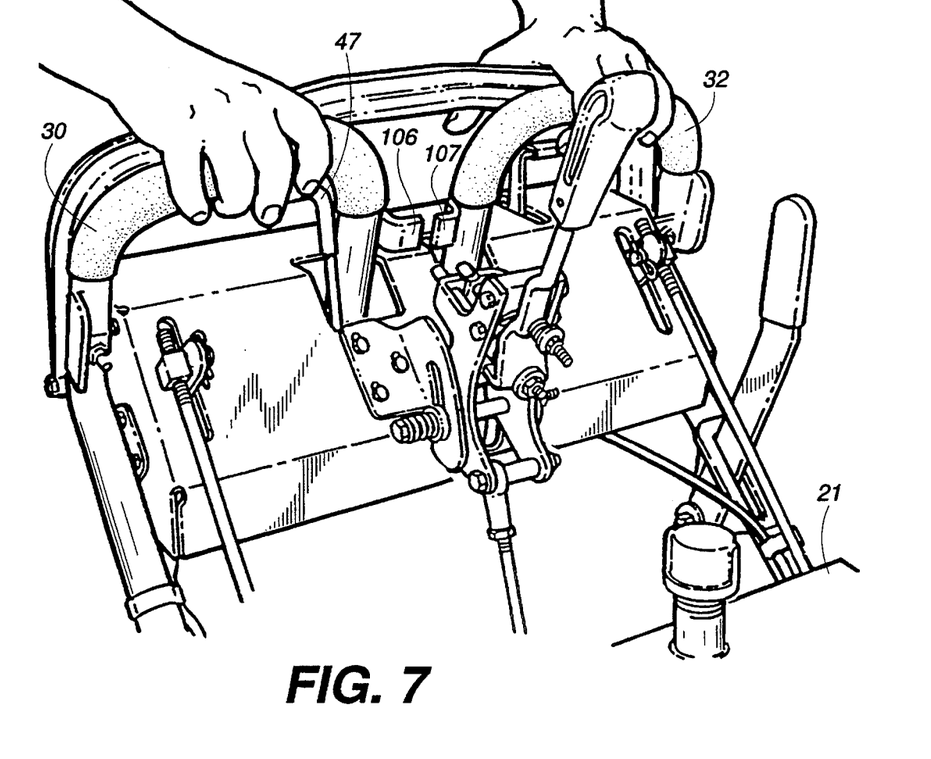
FIG. 7 is a view similar to FIG. 2, illustrating the operation of the locking disengagement lever, with the joystick in its maximum forward position, and the trim setting in substantially the center.

Also discussed later in further detail, when both of the handles 30, 32, are pulled back into their reverse positions, a latch 42 (See FIG. 5) will pivot rearwardly by a spring to force, and will then prevent either of the handles from going into their forward position until a disengagement lever 44 is pulled upwardly as shown in FIG. 7.

When the joystick is pulled all the way back, it provides a "park lock" feature, which is also discussed in further detail below.

Detailed Construction and Operation

The Trim Feature

As discussed above, the handle assembly 18 itself includes a trim control subassembly 20, right and left steering control handles 30, 32, an operator presence control bar 38, and a handlebar 40.

Figure 3:
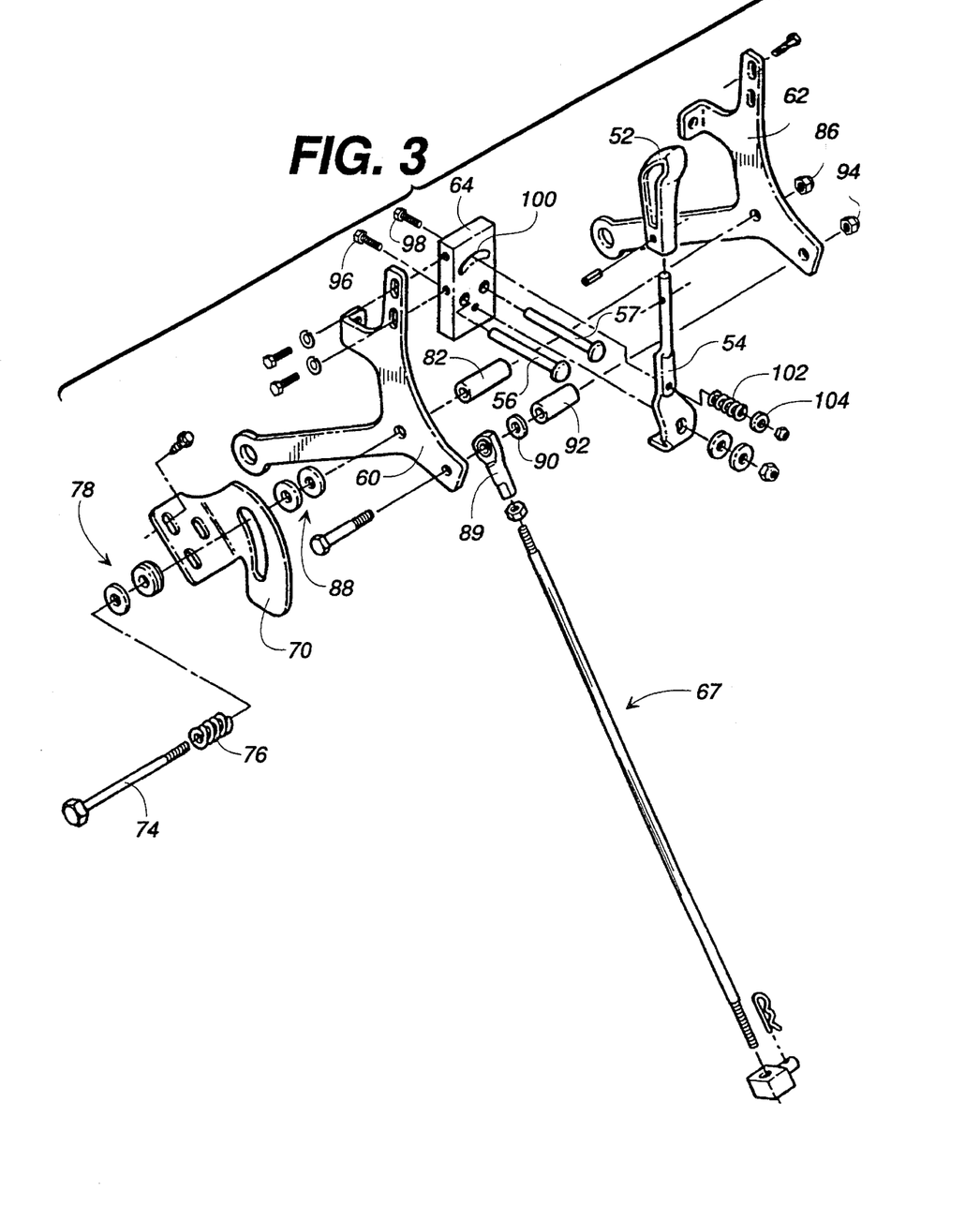
FIG. 3 is an exploded view of the trim subassembly and tie rod according to the present invention.

Referring now to FIG. 3, the trim control includes a grip 52, a joystick shaft 54, right and left stop pins 56, 57, a right frame member 60, a left frame member 62, a template member 64, itself including an arcuate slot 66, and two pin holes which slidably accept the two stop pins 56, 57. The joystick subassembly likewise includes a friction plate 70, attached to a console 72 (See FIG. 5). Referring back to FIG. 3, the trim control subassembly 20 also includes a cross bolt 74, which passes through a compression spring 76 (which provides biasing), through washers 78, frame member 60, a sleeve 82, the left frame member 62 and is captured at the opposite end by nut 86. As discussed later in further detail, the trim control subassembly 20 is allowed to pivot about the longitudinal axis of the bolt 74.

Park lock control rod assembly 67 is attached to the right and left frame members 60, 62, by another crossbolt 88, which passes through the frame members, the upper end 89 of the park lock control rod assembly 67, a washer 90, a sleeve 92, and is captured at its opposite end by a nut 94.

The lower end of the joystick is captured by a bolt 96 which passes through a hole in the template 64, then passes through the joystick member, through washers, and is captured by a nut. There is a certain amount of adjustable controlled friction force in this assembly to allow the joystick to be pivoted side-to-side.

The joystick member 36 is spring-biased against the template 64 by means of a bolt 98, which passes through an arcuate slot 100 in template 64, through a hole in the joystick, through a compression spring 102 which provides a biasing force, and through a washer 104 to be captured finally by a nut.

As may be understood, the compression spring 102 provides a biasing force causing friction between the innermost washer 78 and the friction plate 70 attached to the handle of the mower, such that the joystick subassembly may be pivoted forwardly and rearwardly (about the longitudinal axis of bolt 74) against the frictional force, but the friction preferably provides sufficient force to maintain the joystick subassembly in its set or chosen position once pivoted.

Figure 5:
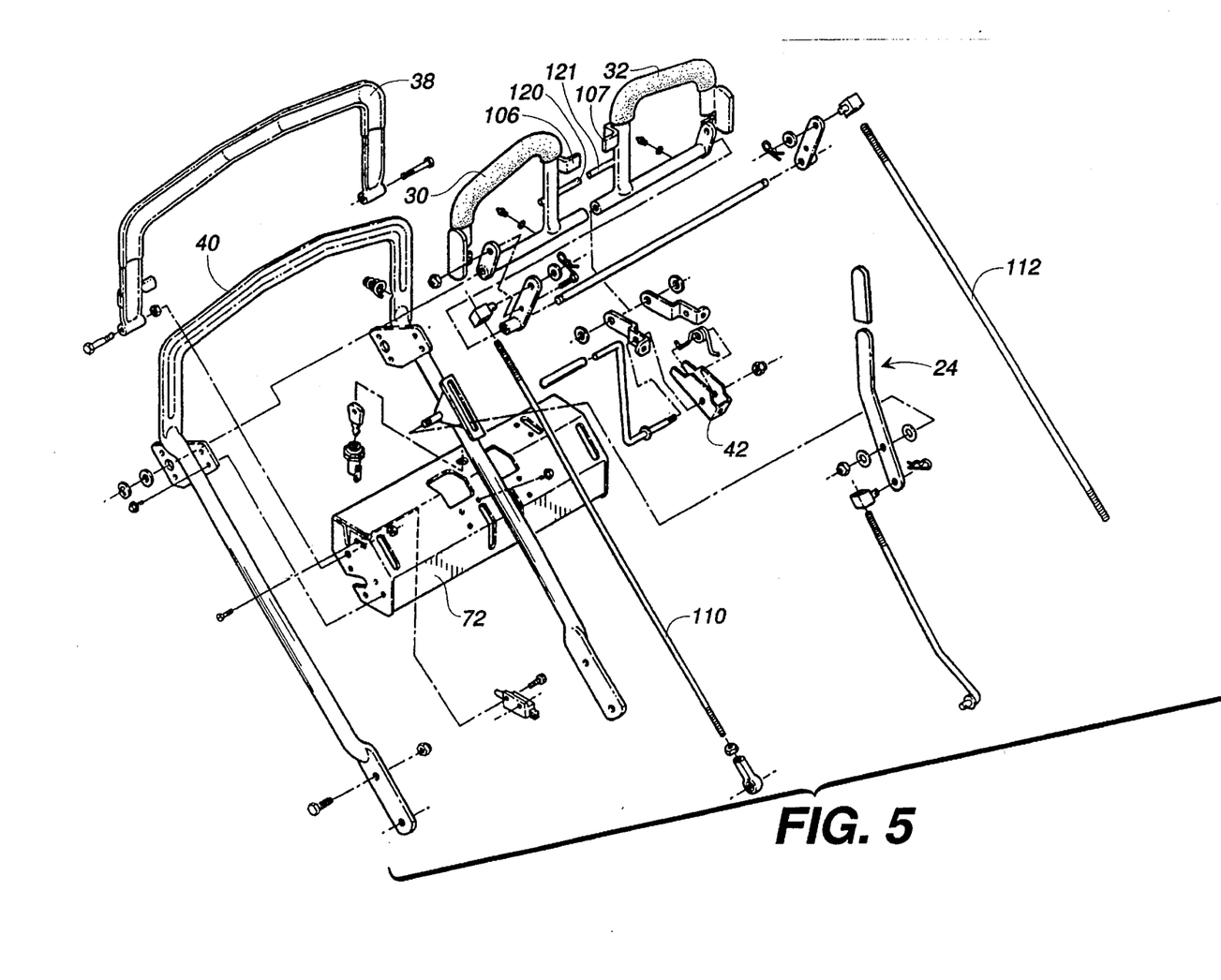
FIG. 5 is an exploded view of a part of the handle assembly according to the present invention.

Referring now to FIG. 5, illustrated are the handle member 40, the operator presence bar 38, the console element 72, and a pair of speed control rods 110, 112. By moving the right and left speed control handles 30, 32, the right and left control rods 110, 112 are moved substantially along their longitudinal axes. These rods are attached to pivoting pump arms such as the right pump arm 124 illustrated in FIG. 6 and left pump arm 125 shown in FIG. 9 these pump arms are attached to trunnion shafts which control valves within the pumps. It may be understood that by rotating the trunnion shafts in one "forward" direction from a "neutral" position (no fluid flow) through an internal valve structure the pump may direct flow through on fluid line to the fluid motors to create forward movement. By rotating the shafts in an opposite "reverse" direction, flow may be directed through a second set of lines to create reverse movement. Therefore the handles control the amount and direction of hydraulic fluid flow to the hydraulic pumps which drive wheels 17, 16, respectfully.

As may be understood, the joystick 36 includes an inclined or "cam" portion 36 which is preferably in contact at all times with the rounded heads of the stop pins, due to spring force which tend to push both handles 30, 32, forwardly. It may also be understood that the rearwardly-directed ends of the stop pins act as "stops" which contact tabs (See FIG. 7) which are fixed to the speed control handles 30, 32, respectively. The longitudinal stop pin axes are both above the pivoting axis of the joystick. As the joystick is pivoted side-to-side along a "pivoting" axis, the inclined surface causes the pins to slide in opposing directions relative to each other along their longitudinal axes. For example, if the joystick 36 is moved to the left as shown in FIG. 4, the left stop pin will be urged rearwardly by a force from the inclined surface, and the right stop pin will be allowed to move forward as more room is available, thus providing a stop for the left side steering control handle which is more rearward than that for the right side steering control handle, when both handles are not being grasped by the operator. Therefore, it may be understood that the left side steering control handle will stop before the right side handle will.

The Neutral Latch Feature

Referring now to FIG. 5, a latching feature provided by the invention is illustrated. The crux of this latching mechanism is providing by a latching element 42, which includes a pair of stops one being a right stop 120 and the other being a left stop 121. It may be understood that when an operator provides both of handles 30, 32, in either a "neutral" or a "reverse" position, the latching element 42, being spring loaded, is allowed to engage a "latched" position (preventing the handles from going into forward but allowing them to remain in neutral or to be pulled into reverse) which may only be disengaged upon movement of unlatching lever 47 (against the spring load) as shown in FIG. 7. In the "latched" position, right and left latch pins 120, 121, respectively (attached to the speed control handles 30, 32) engage the stops 120, 121. It should be understood that the latching element will not go into its "latched" position until both handles are moved into either their neutral or reverse positions.

The Park Lock Feature

Figure 6:
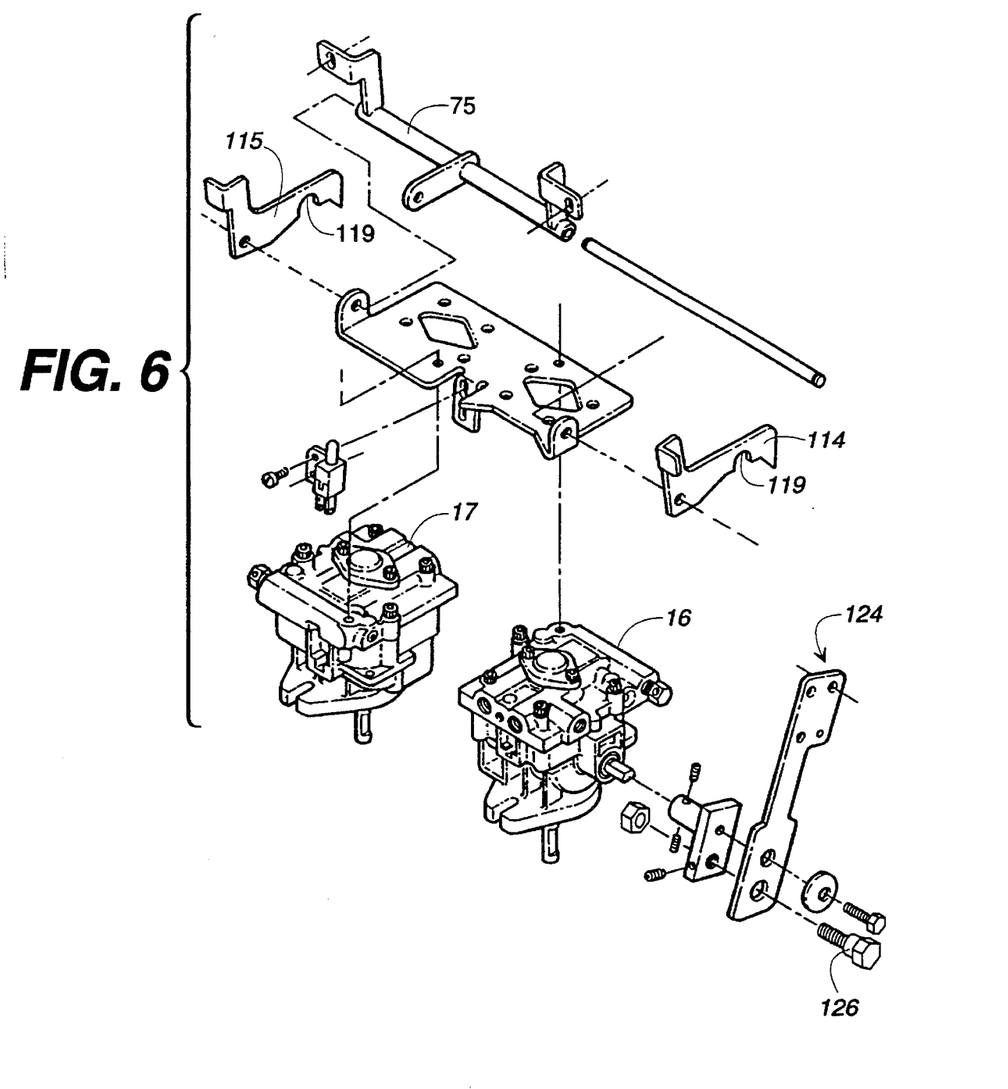
FIG. 6 is an exploded view illustrating the interaction of the hydraulic pumps and the lower locking bar.

Referring now to FIG. 6, right and left hydraulic pumps 16, 17, are illustrated. Also illustrated are right and left park lock template members 114, 115. The right and left park lock template members each include arcuate slots 119.

Figure 8:
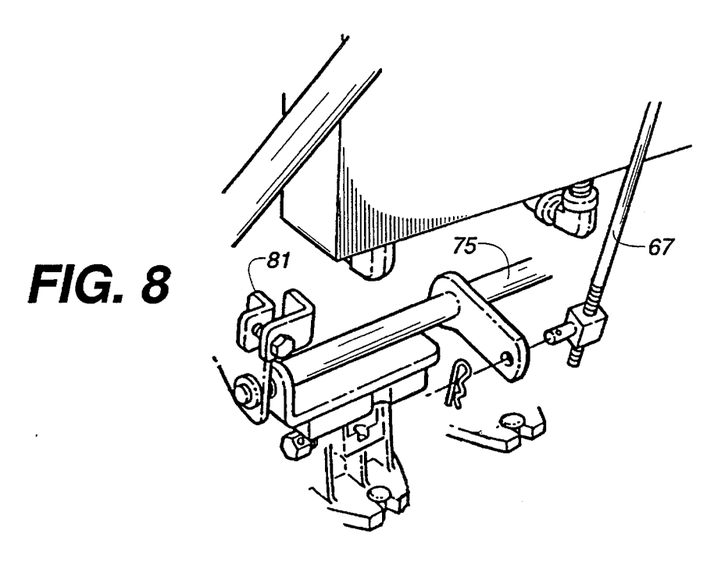
FIGS. 8 and 9 are pictorial partial view of some of the elements of FIG. 6.

As discussed above, the upper end of a tie rod assembly 67 is attached to the pivoting trim control assembly. As seen in FIG. 8, the lower end of this tie rod is attached to a pivoting bar member 75 (see also FIG. 6), which pivots substantially along a substantially horizontal axis, as the joystick is pivoted forward and rearward. This member has attached at each end right and left pivoting park lock template members 114, 115, respectively, which pivot along with the pivoting bar member 75, but also each may be adjusted by means of threaded members such as 97. It should be understood that the threaded members fix the park lock template members to the pivoting bar member, but also allow for relative adjustment.

Figures 9, 10:
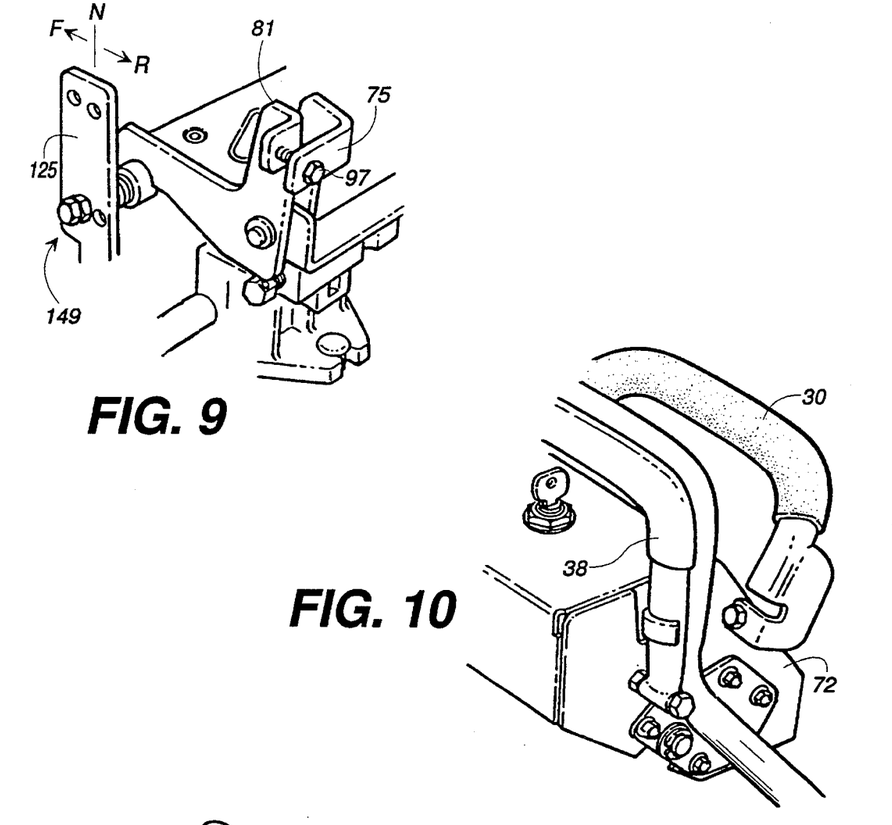
FIG. 10 is a rear, right side pictorial partial view of the upper handle portion of the lawn mower of FIG. 1.

As discussed above, the right and left park lock template members 114, 115, each include an arcuate slot 119, which are configured to accept corresponding roller members which as shown in FIG. 9 which are rotatably attached to right and left pump arms 124, 125, which are attached to trunnion shafts which control valves (not shown) in the pumps, which as discussed above control fluid flow to the corresponding hydraulic motors which drive the wheels.

When the joystick (which may also be referred to as a trim control handle) is moved into its neutral position from a forward position, the park lock control and assembly is moved rearwardly, thus causing the pivoting bar member 75 and the linked park lock templates 114, 115 to move downwardly, thus locking the trunnion shafts of the pumps by locking the pump arms 124, 125. This provides an advantageous "locking" feature which prevents the trunnion shafts from being rotated, thus preventing the drive wheels from being driven in either direction.

General Overall Operation

The mower may be stopped in different ways. One way is possible by using the joystick. By moving the joystick to the "neutral" position, by a series of rods, linkages, slots and notches, the trunnion shafts of both pumps may be locked in their "neutral" position, as described above.

Alternately, when the steering control handles may be simultaneously moved into their "neutral" positions, which will cause the neutral latch 42 to become engaged into its "latched" position. The joystick may then be moved into its neutral or park lock position.

Figure 11:
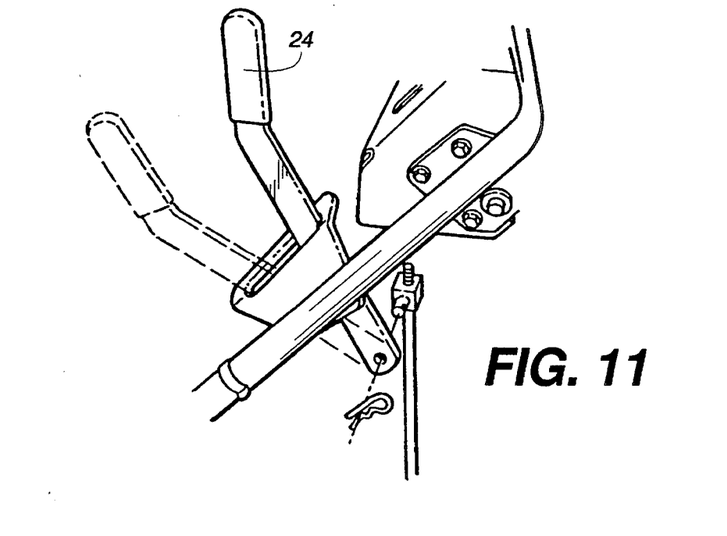
FIG. 11 is a left side view of the blade engagement lever.

In order to operate the mower 10, after the motor is running, the operator presence bar should be depressed against the handlebar. The blade clutch control 24 should then be engaged to its "ON" or down position such as shown in phantom in FIG. 11. The joystick should then be moved forward to select a slow travel speed. This simultaneously moves forward the two stops on the steering control handles. While holding the steering control handles in neutral, the neutral latch should be released by pushing the latch rearward. Simultaneously (and slowly) both steering control handles should then be released, causing them to move forward by the action of spring members and eventually to contact the stop pins. The joystick may then be further adjusted forwardly (more speed) or rearwardly (less speed) to a comfortable level. The operator should then proceed to go forward while allowing the mower to go in a straight line (if preferred). If the mower tends to veer towards the left or right, it can then be brought into a straight path by moving the joystick side-to-side.

To leave the mower running without the operator at the controls, the mower should first be situated upon flat terrain. If the mower is in forward, both steering control members should then be squeezed until the neutral latch is engaged. The blade clutch control should then be positioned in its "OFF" or disengaged position. The joystick should then be centered and pulled back firmly to its "park lock" position. The operator presence control may then be released and the mower engine will continue to run.

Adjustments

The mower should be adjusted periodically for maximum efficiency.

To adjust the mower so that the "park lock" feature is effective, the engine should be stopped and the joystick should be pulled fully backwards to its "park lock" position. As discussed earlier, in this position, both of the neutral lock cavities should fully engage the roller bearings on each pump arm. If such is not the case for a particular pump arm, the adjustment screws 97 (shown in FIG. 9) are provided. By adjusting these screws, the misaligned template members 114 or 115 may be adjusted so that its associated arcuate slot fits on its corresponding roller member.

In addition, a neutral adjustment is also provided at the pump trunnion shafts through the means of an eccentric mounting bolt 126, as shown in FIG. 9. this eccentric bolt works in cooperation with a template 127, which is attached to each pump arm. By adjusting the eccentric bolts 126, the adjustment can be made to the angular relationship of a pump trunnion shaft relative to the corresponding pump lever. Thus adjustment may be made to cause wheel motion to stop when the "park lock" feature is engaged. The above-referenced eccentric bolt fits with holes 148 (See FIG. 6) which extend through the left pump arm.

Conclusion

While this invention has been described in specific detail with reference to the disclosed embodiments, it will be understood that many variations and modifications may be effected within the spirit and scope of the invention as described in the appended claims.

What is claimed is:

1. A lawn mower operable by an operator, said lawn mower comprising:

a frame;

an internal combustion engine mounted to said frame;

at least one vegetation cutting blade;

means for rotatably driving said blade by said engine;

first and second drive wheels rotatably mounted relative to said frame;

first and second drive train means for transferring power from said engine to corresponding first and second drive wheels to cause each of said drive wheels to turn forwardly and attain a corresponding forward speed;

first and second speed control means for independently and variably controlling the amount of speed attained by said first and second wheels resulting from power delivered from said engine to each of said drive wheels by said drive train means; and trim control means including a joystick and first and second stop means for limiting the amount of maximum power delivered to said drive wheels by said speed control means, said first and second stop means of said trim control means being adjustable relative to each other by movement of said joystick by said operator to allow said operator to relatively adjust the maximum forward speeds of each of said wheels by manually manipulating said trim control means.

2. The claim as set forth in claim 1, wherein said trim control means includes a frame and wherein said stop means are provided by the ends of first and second pins slidably adjustable relative to said trim control frame frame along their longitudinal axes, said first and second pins being part of said trim control means.

3. The mower as claimed in claim 2, wherein said joystick also defines an inclined portion which is in sliding contact with said second ends of said pins, such that as said joystick is moved side-to-side, said pins tend to move in relatively opposite directions along their longitudinal axes.

4. A lawn mower capable of control by an operator, said lawn mower comprising:

a frame;

an internal combustion engine mounted to said frame;

at least one vegetation cutting blade;

means for rotatably driving said blade by said engine;

first and second drive wheels rotatably mounted relative to said frame;

first and second hydraulic drive train means for transferring power from said engine to corresponding first and second drive wheels at least partially through hydraulics such that each of said drive wheels may operate in a range from neutral to forward;

first and second speed control means for independently controlling the amount of speed attained by said first and second wheels resulting from power delivered from said engine to said first and second drive wheels by said first and second drive train means, said first and second control means each having neutral and forward positions; and lock means including a manually operable joystick operable by said operator for locking said first and second control means in said neutral positions.

5. The lawn mower as claimed in claim 4, further comprising first and second stop means for limiting the amount of forward speed attained by said first and second wheels resulting from power delivered to said drive wheels by said control means wherein said first and second stop means are adjustable relative to each other.

6. A lawn mower capable of operation by an operator, said lawn mower comprising;

a frame;

an internal combustion engine mounted to said frame;

at least one vegetation cutting blade;

means for rotatably driving said blade by said engine;

first and second drive wheels rotatably mounted relative to said frame;

first and second drive train means for transferring power from said engine to corresponding first and second drive wheels such that each of said drive wheels may operate in a range from forward through neutral to reverse;

first and second speed control means for independently controlling the amount of speed attained by said first and second wheels resulting from power delivered from said engine to said drive wheels by said drive train means, said first and second speed control means each having positions in a range from forward through neutral to reverse corresponding to operation of said drive train means; and selectively manually disengagable latch means for latching said first and second speed control means in neutral positions responsive to the simultaneous positioning of said first and second control means in either neutral or reverse by said operator.

7. A lawn mower capable of traveling in a straight forward direction and also turning left and right under the control of an operator, said lawn mower comprising:

a frame;

an internal combustion engine mounted to said frame;

at least one vegetation cutting blade;

means for rotatably driving said blade by said engine;

first and second drive wheels rotatably mounted relative to said frame, for propelling said frame relative to the ground from rest to a forward speed;

first and second drive train means for transferring power from said engine to corresponding said first and second drive wheels to cause each of said first and second drive wheels to rotate from rest to a set forward speed;

first and second speed control means, each independently movable from a neutral position to a set forward position, said first and second speed control means independently controlling the amount of forward speed of said first and second drive wheels;

first and second stop means for independently setting said set forward positions of said first and second speed control means; and a manually operable joystick operably linked with said first and second stop means to allow said operator to adjust said first and second stop means relative to each other to allow said operator to relatively adjust the amount of speed obtained by said drive wheels.

8. The lawn mower as claimed in claim 7, wherein each of said drive means comprises a hydraulic pump driven by said engine and driving a corresponding hydraulic motor which itself drives a corresponding drive wheel.

9. The lawn mower as claimed in claim 7, wherein each of said drive means is configured to drive its corresponding drive wheel in a range of directions including forward and reverse.

10. The claim as set forth in claim 7, further comprising a trim control body mounted relative to said frame, wherein said joystick is pivotably mounted along a first axis relative to said trim control body, to allow an operator to pivot said joystick relative to said trim control body in order to vary the relative positions of said first and second stops and correspondingly the relative forward speeds of said first and second drive wheels.

11. The claim as set forth in claim 10, wherein said trim control body is pivotably mounted along a second axis relative to said apparatus frame, to allow an operator to move said trim control body generally forward-to-rearward relative to the straight forward travel of said lawn mower, in order to simultaneously vary the positions of said first and second stop surfaces and correspondingly the relative forward speeds of said first and second drive wheels, said second axis being substantially perpendicular to said direction of straight forward travel of said lawn mower.

12. The claim as set forth in claim 10, wherein said trim control body is pivotably mounted along a second axis relative to said apparatus frame, to allow an operator to move said trim control body generally forward-to-rearward relative to the straight forward travel of said lawn mower, in order to simultaneously vary the positions of said first and second stop surfaces and correspondingly the relative forward speeds of said first and second drive wheels, said second axis being substantially perpendicular to said direction of straight forward travel of said lawn mower, such that a "zero turn radius" feature is provided.

13. The lawn mower as claimed in claim 7, wherein said left and right speed control means in combination include left and right speed control loop handles pivotably attached relative to said frame of said lawn mower, said left and right speed control loop handles configured to allow an operator to control the speed of said first and second drive wheels by manually manipulating said left and right speed control loop handles.

14. A lawn mower capable of traveling in a straight forward direction and also turning left and right under the control of an operator, said lawn mower comprising:

a frame;

an internal combustion engine mounted to said frame;

at least one vegetation cutting blade;

means for rotatably driving said blade by said engine;

first and second drive wheels rotatably mounted relative to said frame, for propelling said frame relative to the ground from rest to a forward speed;

first and second hydraulic drive train means for transferring power from said engine to corresponding first and second drive wheels at least partially through hydraulics to cause each of said first and second drive wheels to rotate from rest to a set forward speed;

first and second speed control means, each independently movable from a neutral position to a set forward position, said first and second speed control means independently controlling the amount of forward speed of said first and second drive wheels; and trim control means including a manually operable joystick, and also including first and second stop means for independently setting said set forward positions of said first and second speed control means, said first and second stop means adjustable relative to each other by manual operation of said joystick to allow said operator to relatively adjust the amount of speed obtained by said drive wheel.

15. The lawn mower as claimed in claim 14, wherein each of said drive means is configured to drive its corresponding drive wheel in a range of directions including forward and reverse.

16. The claim as set forth in claim 14, further comprising a trim control body mounted relative to said frame, wherein said joystick is pivotably mounted along a first axis relative to said trim control body, and said joystick and said stops are configured to allow an operator to pivot said joystick relative to said trim control body in order to vary the relative positions of said first and second stops and correspondingly the relative forward speeds of said first and second drive wheels.

17. The claim as set forth in claim 16, wherein said trim control body is pivotably mounted along a second axis relative to said apparatus flame to allow an operator to grasp said joystick and move said trim control body generally forward-to-rearward relative to the straight forward travel of said lawn mower, in order to simultaneously vary the positions of said first and second stop surfaces and correspondingly the relative forward speeds of said fast and second drive wheels, said second axis being substantially perpendicular to said direction of straight forward travel of said lawn mower.

18. The claim as set forth in claim 15, further comprising a trim control body mounted relative to said frame, wherein said joystick is pivotably mounted along a first axis relative to said trim control body, and said joystick and said stops are configured to allow an operator to pivot said joystick relative to said trim control body in order to vary the relative positions of said first and second stops and correspondingly the relative forward speeds of said first and second drive wheels.

19. The lawn mower as claimed in claim 14, wherein said left and right speed control means in combination include left and right speed control loop handles pivotably attached relative to said frame of said lawn mower, said left and right speed control loop handles configured to allow an operator to control the speed of said first and second drive wheels by manually manipulating said left and right speed control loop handles.

* * * * *